United States Patent
Erimli

(10) Patent No.: US 7,346,707 B1
(45) Date of Patent: *Mar. 18, 2008

(54) ARRANGEMENT IN AN INFINIBAND CHANNEL ADAPTER FOR SHARING MEMORY SPACE FOR WORK QUEUE ENTRIES USING MULTIPLY-LINKED LISTS

(75) Inventor: Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 827 days.

This patent is subject to a terminal disclaimer.

(21) Appl. No.: 10/046,784

(22) Filed: Jan. 16, 2002

(51) Int. Cl.
G06F 15/16 (2006.01)
G06F 15/167 (2006.01)
G06F 15/173 (2006.01)
G06F 3/00 (2006.01)
G06F 13/00 (2006.01)

(52) U.S. Cl. .................. 709/250; 709/212; 709/213; 709/217; 709/224; 710/1; 710/100

(58) Field of Classification Search ............... 709/250, 709/212–216, 217, 224; 710/22, 308, 310, 710/1, 100, 260
See application file for complete search history.

(56) References Cited

U.S. PATENT DOCUMENTS

| | | | | |
|---|---|---|---|---|
| 5,311,509 A | * | 5/1994 | Heddes et al. | 370/397 |
| 6,108,809 A | * | 8/2000 | Schwarz | 714/749 |
| 6,453,360 B1 | * | 9/2002 | Muller et al. | 709/250 |
| 6,611,883 B1 | * | 8/2003 | Avery | 710/22 |
| 6,622,193 B1 | * | 9/2003 | Avery | 710/263 |
| 6,662,213 B1 | * | 12/2003 | Xie et al. | 709/206 |
| 6,697,380 B1 | | 2/2004 | Egbert | |
| 6,735,642 B2 | * | 5/2004 | Kagan et al. | 710/24 |
| 6,789,143 B2 | * | 9/2004 | Craddock et al. | 710/54 |
| 6,813,653 B2 | * | 11/2004 | Avery | 710/22 |
| 7,085,869 B1 | * | 8/2006 | Acharya et al. | 710/263 |
| 7,269,666 B1 | * | 9/2007 | Leitner et al. | 709/250 |
| 2002/0152327 A1 | * | 10/2002 | Kagan et al. | 709/250 |
| 2002/0165899 A1 | * | 11/2002 | Kagan et al. | 709/104 |
| 2003/0018828 A1 | * | 1/2003 | Craddock et al. | 709/321 |

OTHER PUBLICATIONS

Cassiday, "InfiniBand™ Architecture Tutorial" Hot Chips, Aug. 2000, Sun Microsystems.

* cited by examiner

Primary Examiner—John Follansbee
Assistant Examiner—Kamal Divecha
(74) Attorney, Agent, or Firm—Manelli Denison & Selter PLLC; Leon R. Turkevich

(57) ABSTRACT

A channel adapter includes a work queue entry table having entries configured for storing work queue entries awaiting respective acknowledgements. Each entry includes a work queue entry field for storing a corresponding work queue entry, and first and second link fields for respective linked lists. The channel adapter also includes a table manager configured for creating the linked lists, based on prescribed network conditions, for example for storage of a first list specifying a transmission order of the work queue entry fields and a second list specifying an acknowledgement order. Hence, the multiple link fields enable the work queue entry table to be shared for respective linked lists specifying respective attributes relative to the stored work queue entries.

10 Claims, 3 Drawing Sheets

ARRANGEMENT IN AN INFINIBAND CHANNEL ADAPTER FOR SHARING MEMORY SPACE FOR WORK QUEUE ENTRIES USING MULTIPLY-LINKED LISTS

BACKGROUND OF THE INVENTION

1. Field of the Invention

The present invention relates to a storing work queue entry (WQE) information awaiting acknowledgements in a channel adapter configured for communication with other channel adapters in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

However, arbitrary hardware implementations may result in substantially costly hardware designs. For example, a host channel adapter (HCA) provides a reliable service connection (e.g., reliable connection service, reliable datagram service) for a queue pair (QP) by retransmitting a packet if a corresponding acknowledgment is not received within a prescribed time interval following transmission of the packet. Hence, the transmitting HCA needs to keep track of the transmitted packets of a reliable service connection to determine whether an acknowledgment has been received for each corresponding transmitted packet. However, inefficient hardware implementations may result in substantially large memory requirements, increasing the cost of the HCA. In addition, problems may arise if a channel adapter is unable to resend transmitted packets for WQEs awaiting acknowledgement.

SUMMARY OF THE INVENTION

There is a need for an arrangement that enables a host channel adapter to be implemented in an efficient and economical manner.

There also is a need for an arrangement that enables a host channel adapter to track whether transmitted data packets need to be resent for WQEs awaiting acknowledgement, independent of when the channel adapter is able to resend the transmitted data packets, in an economical and efficient manner.

These and other needs are attained by the present invention, where a channel adapter includes a work queue entry table having entries configured for storing work queue entries awaiting respective acknowledgements. Each entry includes a work queue entry field for storing a corresponding work queue entry, and first and second link fields for respective linked lists. The channel adapter also includes a table manager configured for creating the linked lists, based on prescribed network conditions, for example for storage of a first list specifying a transmission order of the work queue entry fields and a second list specifying an acknowledgement order. Hence, the multiple link fields enable the work queue entry table to be shared for respective linked lists specifying respective attributes relative to the stored work queue entries.

One aspect of the present invention provides a method in a channel adapter configured for communications with a server network system. The method includes first storing, in a table configured for storing multiple entries, an entry having a work queue entry field that specifies a transmitted work queue entry. The entry includes at least first and second link fields each configured for referencing another entry in the table. In particular, the first storing step includes storing in the first link field a first entry identifier for either the transmitted work queue entry, or a subsequently transmitted work queue entry relative to the transmitted work queue entry. The first entry identifiers in the respective first link fields form a first linked list specifying a transmit sequence of the transmitted work queue entries. The method also includes detecting an acknowledgement for at least a first of the transmitted work queue entries stored in the table, and generating in the table a second linked list. The second linked list specifies an acknowledgement sequence of the transmitted work queue entries. In particular, the second linked list is generated by storing, in the second link field of the entry corresponding to the transmitted work queue entry, a second entry identifier. The second entry identifier is stored based on the detecting step, and specifies either the first transmitted work queue entry or an entry having received a subsequent acknowledgement relative to the detected acknowledgement.

Hence, a single table can be used to store multiple attributes of transmitted work queue entries, including the sequence of transmission, plus the sequence of received acknowledgements.

Another aspect of the present invention provides a channel adapter. The channel adapter includes a table configured for storing entries identifying respective work queue entries having been transmitted according to a service protocol requiring receipt of an acknowledgment message. Each entry includes: a work queue entry field configured for specifying the corresponding work queue entry; a first link field configured for specifying a first entry identifier referencing one of the corresponding entry and another entry for a subsequently transmitted work queue entry relative to the corresponding entry, and a second link field. The second link field is configured for storing a second entry identifier referencing one of the corresponding entry and another entry having received a subsequent acknowledgement. The channel adapter also includes an acknowledgement detector configured for detecting the acknowledgements for the work queue entries, and a table manager. The table manager is configured for adding the table entries based on transmission of the respective work queue entries. In particular, the table manager is configured for inserting the corresponding first entry identifier based on the subsequently transmitted work queue entry, and inserting the corresponding second entry identifier based on the entry having received the subsequent acknowledgement. The first and second link fields form first and second linked lists identifying a transmit sequence of the transmitted work queue entries and an acknowledgement sequence of the transmitted work queue entries, respectively.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
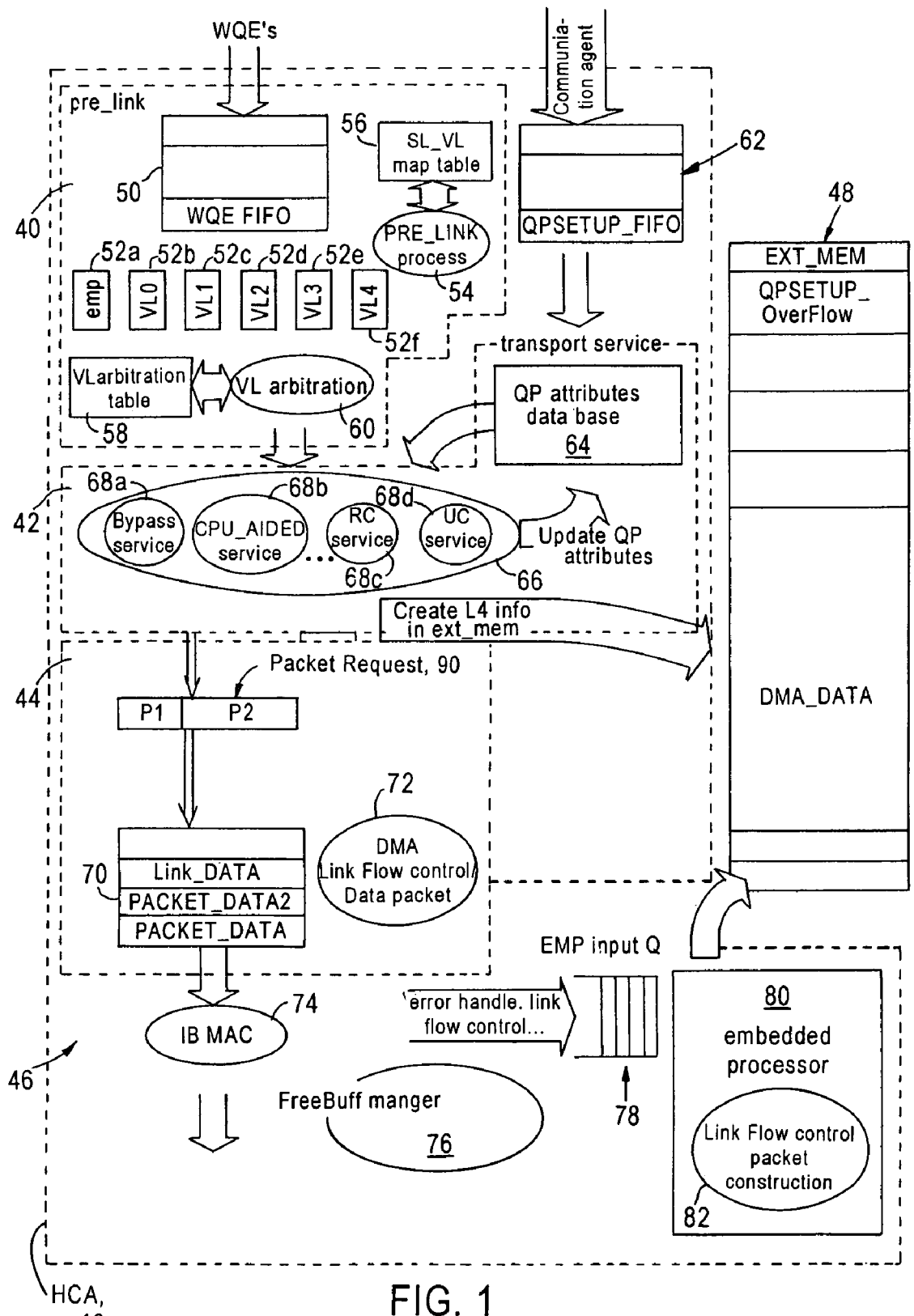
FIG. 1 is a diagram illustrating a host channel adapter configured for generating transmit packets according to an embodiment of the present invention.

FIG. 1 is a block diagram illustrating a host channel adapter (HCA) 12 configured for generating and outputting transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 of FIG. 1 includes a pre-link module configured for determining a priority of received WQEs, and a post-link module configured for preparing a data packet for transmission on the network. The pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 40, a transport service module 42, a post-link module 44, and a media access control (MAC) module 46. The HCA 12 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 12 is configured for receiving data from a central processing unit (CPU) in the form of work queue elements (WQEs), stored in the WQE FIFO 50. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and teardown of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process, management traffic, or flow control traffic.

The transport service module 42 is configured for managing transport services, including setup, management, and teardown of queue pairs. In particular, the HCA 12 includes a queue pair setup FIFO 62 configured for storing queue pair commands received from a communication management agent. The communication management agent is responsible for setup and teardown of transport connections: the communication management agent communicates with a subnet manager to establish the transport connections (i.e., queue pairs) for the HCA 12. In addition, the communication management agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents. Additional details regarding the teardown of queue pairs are described below with reference to FIG. 2 and FIGS. 3A and 3B.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively.

The submodule 68 then creates a header pointer (p1) that identifies the location of the transport layer header. The submodule 68 then sends to the post-link module 44 the payload pointer (p2) and the header pointer (p1) as a packet request 90, enabling the post-link module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-link module. Alternately, while writing to the external memory, the CPU may leave blank spaces at the beginning of the data, so that the actual header information that is created within the modules 68 can be stored in the corresponding empty memory space. The pointer passed down to the post-link module 44 could be this pointer which points to the beginning of the frame in the external memory.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent. Additional details describing the retransmission operation is described below with reference to FIGS. 2 and 3.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52*a*. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

Figure 2:
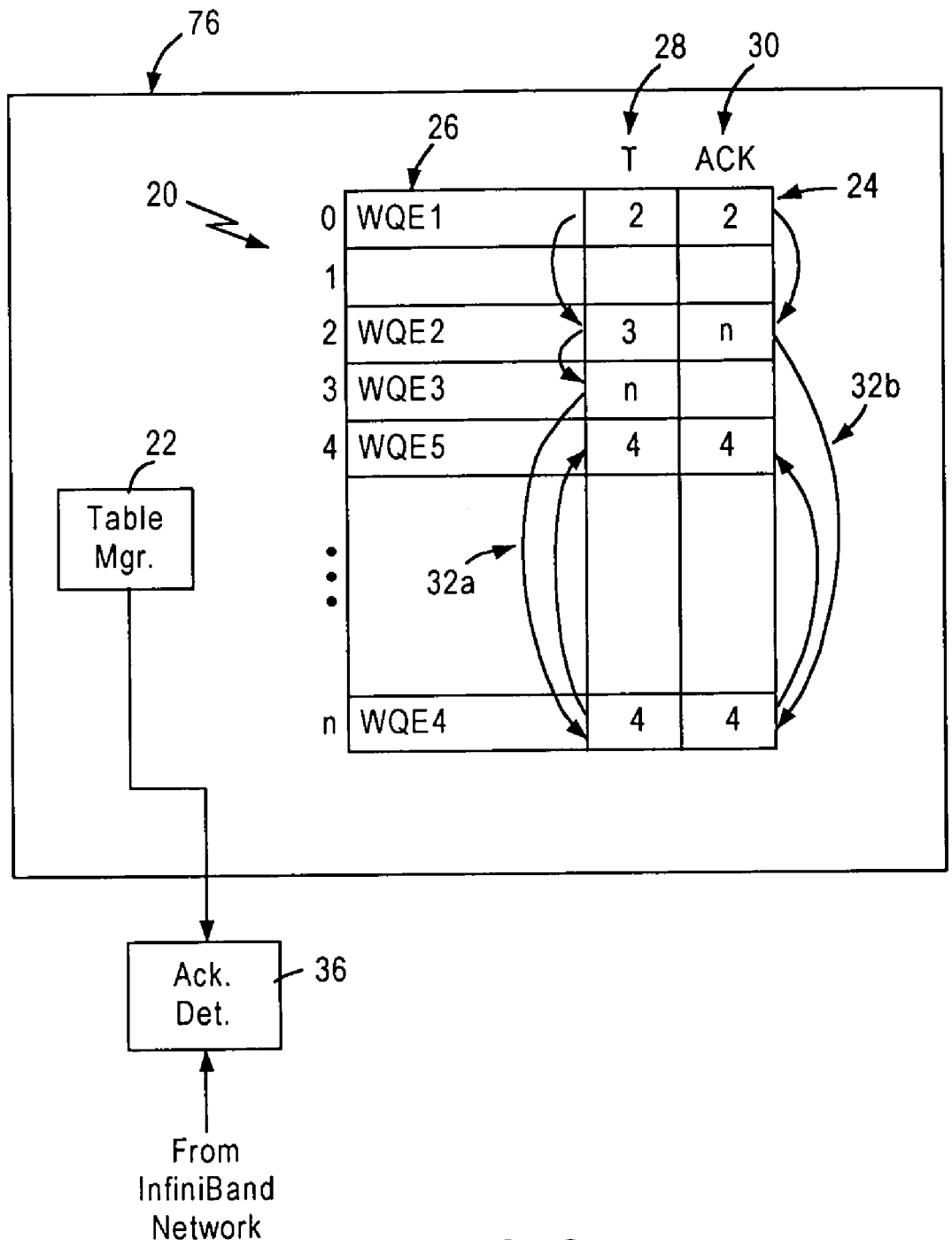
FIG. 2 is a diagram illustrating in further detail the free buffer manager, also referred to as the retransmission module, according to an embodiment of the present invention.
Figure 3A:
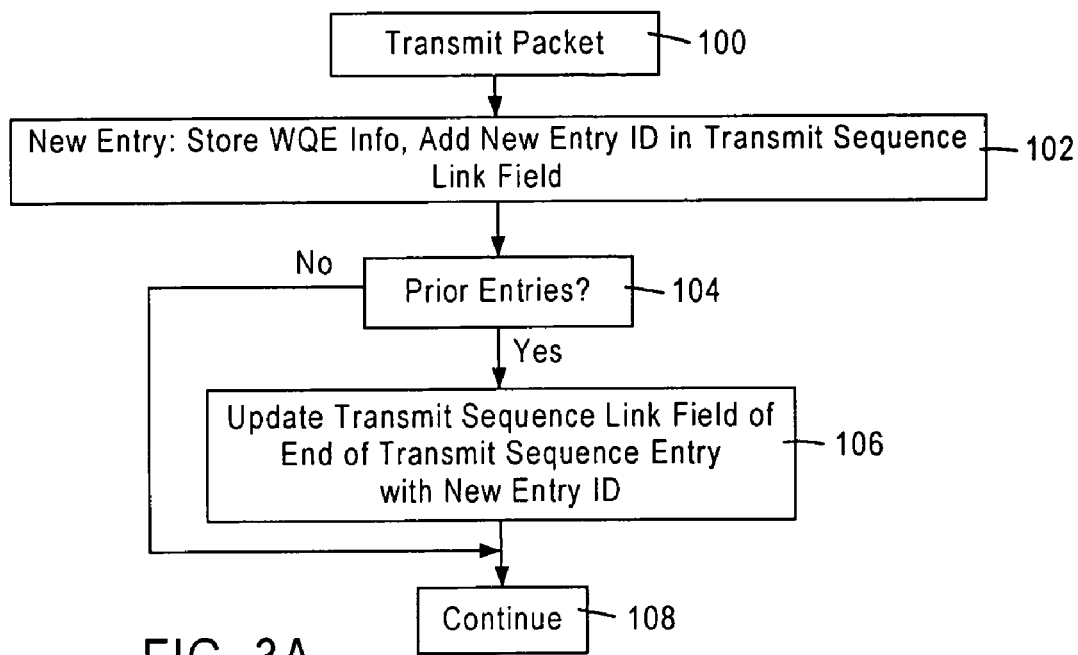
FIGS. 3A and 3B are diagrams summarizing the method of managing packets awaiting acknowledgment for selective retransmission according to an embodiment of the present invention.
Figure 3B:
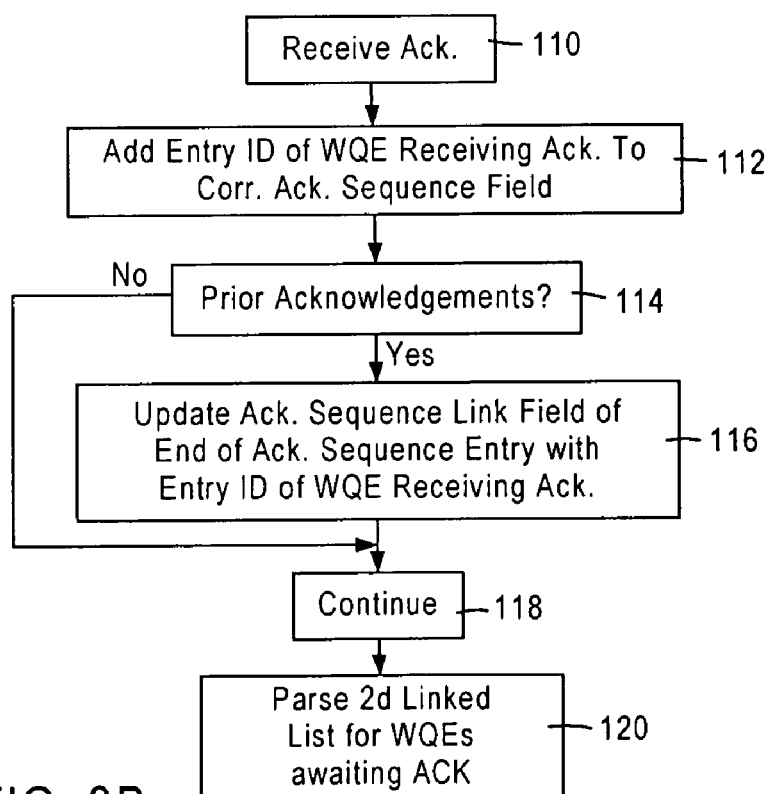

FIG. 2 is a diagram illustrating in further detail the free buffer manager 76, configured for selectively controlling retransmission of selected packets sent according to a reliable service protocol (e.g., reliable connection service or reliable datagram service) according to an embodiment of the present invention. FIGS. 3A and 3B are diagrams illustrating the methods of generating linked lists shared within the same memory for monitoring of WQE attributes, according to an embodiment of the present invention.

The free buffer manager 76, also referred to as a retransmission module, is configured for monitoring whether a packet transmitted according to a reliable service protocol needs to be retransmitted by the post-link module 44 and the MAC 74.

The retransmission module 76 includes a table 20 and a table manager 22. The table 20 includes entries 24 that identify WQEs having been transmitted according to a service protocol requiring acknowledgment. In particular, each entry 24 includes a WQE field 26, a first link field ("T") 28, and a second link field ("Ack") 30. Referring to FIG. 3A, as each packet for a WQE (e.g., WQE5) is transmitted by the HCA 12 in step 100, the table manager 22 adds in step 102 a corresponding table entry 24 (e.g., in location 4). In addition, the table manager 22 inserts a corresponding link identifier into the first link field 28 that specifies the relative position of the corresponding WQE entry 24 to other transmitted WQEs. In particular, the first link fields 28 are used to form a linked list 32*a* that specifies the transmit sequence of the transmitted work queue entries; in the case of the last transmitted WQE entry (e.g., WQE5), the table manager 22 inserts the corresponding identifier ("4") representing the end of the linked list 32*a*. If in step 104 the table manager 22 determines there are prior stored entries 24 of transmitted WQEs, the table manager 22 updates the transmit sequence link field 28 of the prior end of the transmit sequence (e.g., entry "n") with the identifier of new subsequently transmitted work entry (e.g., "4" for WQE 5). The process repeats itself in step 108 for the next transmitted WQE. As illustrated in FIG. 2, the linked list 32*a* specifies the transmit sequence of WQEs WQE1, WQE2, WQE3, WQE4, and WQE5, even though the respective entries 24 are not in contiguous memory locations.

FIG. 3B is a diagram illustrating generation of the second linked list 32b within the same table 20 configured for storing attributes of the transmitted WQEs. The second link field 30 is used to form a second linked list 32b that specifies the acknowledgment sequence of transmit work queue entries. As illustrated in FIGS. 2 and 3B, the acknowledgment detector 36 is configured for detecting the acknowledgements for the WQEs stored in the table 20. The acknowledgement detector, in response to detecting an acknowledgment for one of the stored work queue entries in step 110, notifies the table manager 22 of the acknowledgement for the specified WQE. The table manager 22 adds in step 112 the entry identifier of the WQE receiving the acknowledgement (e.g., "4" for WQE5). If in step 114 there are no prior acknowledgments, the table manager 22 repeats the sequence in step 1118 for subsequent acknowledgments.

However if prior acknowledgments have been received, the table manager 22 updates in step 116 the acknowledgment sequence link field 30 of the prior end of the acknowledge sequence (e.g., entry "n") with the identifier of work entry (e.g., "4" for WQE 5) having received the subsequent acknowledgment. Hence, the table manager 22 is able to generate the second linked list 32b, indicating the sequence of acknowledgments, illustrated in FIG. 2 as the sequence WQE1, WQE2, WQE4, and WQE5. Hence, the table manager 22 can parse the second linked list 32b in step 120 and compare with the first linked list 32a to determine the transmitted work queue entries awaiting acknowledgment (e.g., WQE3).

According to the disclosed embodiment, transmitted WQEs awaiting receipt of acknowledgment messages can be efficiently managed and maintained using multiple fields configured for specifying respective linked lists for respective attributes of the WQEs, optimizing memory utilization within the channel adapter.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a channel adapter configured for communications with a server network system, the method comprising:

first storing by the channel adapter, in a table configured for storing multiple entries, an entry having a work queue entry field that specifies a transmitted work queue entry in response to completed transmission by the channel adapter into the server network system of a corresponding transmit packet associated with the transmitted work queue entry, the entry including at least first and second link fields, the first storing of the entry including storing in the first link field a first entry identifier for one of the transmitted work queue entry or a subsequently transmitted work queue entry having a corresponding transmit packet transmitted by the channel adapter into the server network system relative to the transmitted work queue entry, wherein the first entry identifiers in the respective first link fields form a first linked list specifying a transmit sequence of the transmitted work queue entries having respective transmit packets transmitted by the channel adapter into the server network system;

detecting by the channel adapter an acknowledgement from the server network system for at least a first of the transmitted work queue entries stored in the table; and generating in the table, by the channel adapter, a second linked list specifying an acknowledgement sequence of the transmitted work queue entries by second storing, in the second link field of the entry corresponding to the first transmitted work queue entry, a second entry identifier in response to the detecting of the acknowledgement, the second entry identifier specifying one of the first transmitted work queue entry or an entry having received a subsequent acknowledgement relative to the detected acknowledgement.

2. The method of claim 1, wherein the first storing of the entry includes storing the entry in a send queue table by a free buffer manager.

3. The method of claim 1, further comprising parsing the second linked list to determine transmitted work queue entries awaiting acknowledgement.

4. The method of claim 1, wherein the detecting of the acknowledgement includes detecting the acknowledgement according to InfiniBand™ protocol.

5. A channel adapter comprising:

a table configured for storing entries identifying respective work queue entries having respective transmit packets been transmitted by the channel adapter into a server network system according to a service protocol requiring receipt of an acknowledgment message, each entry including:

(1) a work queue entry field configured for specifying the corresponding work queue entry having a corresponding transmit packet transmitted by the channel adapter into the server network system, (2) a first link field configured for specifying a first entry identifier referencing one of the corresponding entry or a subsequently transmitted work queue entry having a corresponding transmit packet transmitted by the channel adapter into the server network system relative to the corresponding entry, and (3) a second link field configured for storing a second entry identifier referencing one of the corresponding entry or an entry having received a subsequent acknowledgement;

an acknowledgement detector configured for detecting the acknowledgements from the server network system for the work queue entries; and a table manager configured for adding the table entries in response to completed transmission of the respective transmit packets for the work queue entries into the server network system, the table manager configured for inserting the corresponding first entry identifier in response to the corresponding transmit packet of the subsequently transmitted work queue entry having been transmitted by the channel adapter into the server network system, the table manager configured for inserting the corresponding second entry identifier in response to the entry having received the subsequent acknowledgement, the first and second link fields forming first and second linked lists identifying a transmit sequence of the transmitted work queue entries having respective transmit packets transmitted by the channel adapter into the server network system, and an acknowledgement sequence of the transmitted work queue entries, respectively;

wherein the channel adapter is implemented as an integrated circuit.

6. The channel adapter of claim 5, wherein the acknowledgement detector is configured for detecting the acknowledgement according to InfiniBand™ protocol.

7. The channel adapter of claim 5, wherein the table manager is configured for parsing the second linked list to determine transmitted work queue entries awaiting acknowledgement.

8. The method of claim 1, wherein the channel adapter is implemented as an integrated circuit.

9. The method of claim 8, wherein the integrated circuit is implemented as an application-specific integrated circuit.

10. The channel adapter of claim 5, wherein the integrated circuit is implemented as an application-specific integrated circuit.

* * * * *